US008683185B2

(12) United States Patent
Flachs et al.

(10) Patent No.: US 8,683,185 B2
(45) Date of Patent: Mar. 25, 2014

(54) CEASING PARALLEL PROCESSING OF FIRST SET OF LOOPS UPON SELECTABLE NUMBER OF MONITORED TERMINATIONS AND PROCESSING SECOND SET

(75) Inventors: Brian Flachs, Georgetown, TX (US); Charles Ray Johns, Austin, TX (US); Ulrich Weigand, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 12/843,224

(22) Filed: Jul. 26, 2010

(65) Prior Publication Data
US 2012/0023316 A1    Jan. 26, 2012

(51) Int. Cl.
*G06F 9/30*    (2006.01)

(52) U.S. Cl.
USPC ..................................... 712/241; 712/E9.078

(58) Field of Classification Search
None
See application file for complete search history.

(56) References Cited

U.S. PATENT DOCUMENTS

| 5,274,818 | A | 12/1993 | Vasilevsky et al. |
|---|---|---|---|
| 5,381,536 | A | 1/1995 | Phelps et al. |
| 5,381,550 | A | 1/1995 | Jourdenais et al. |
| 5,481,723 | A | 1/1996 | Harris et al. |
| 5,535,393 | A | 7/1996 | Reeve et al. |
| 6,016,397 | A | 1/2000 | Ogasawara et al. |
| 6,106,575 | A | 8/2000 | Hardwich |
| 6,145,076 | A | 11/2000 | Gabzdyl et al. |
| 6,615,340 | B1 | 9/2003 | Wilmot, II |
| 7,334,110 | B1 | 2/2008 | Faanes et al. |
| 7,363,472 | B2 | 4/2008 | Stuttard et al. |
| 7,404,041 | B2 | 7/2008 | Gara et al. |
| 8,019,977 | B2 | 9/2011 | Gonion et al. |
| 8,131,979 | B2 | 3/2012 | Gonion et al. |
| 2003/0005029 | A1 | 1/2003 | Shavit et al. |
| 2003/0037221 | A1 | 2/2003 | Gschwind et al. |

(Continued)

FOREIGN PATENT DOCUMENTS

| EP | 0691607 A2 | 1/1996 |
|---|---|---|
| EP | 0843258 A2 | 5/1998 |

(Continued)

OTHER PUBLICATIONS

Kimball et al., "Software Transactions Meet First-Class Continuations", pp. 1-12, Scheme and Functional Programming Workshop '07, Sep. 2007, Freiburg Germany.

(Continued)

*Primary Examiner* — Kenneth Kim
(74) *Attorney, Agent, or Firm* — Yee & Associates, P.C.; Diana Roberts-Gerhardt (57) ABSTRACT

The illustrative embodiments comprise a method, data processing system, and computer program product having a processor unit for processing instructions with loops. A processor unit creates a first group of instructions having a first set of loops and second group of instructions having a second set of loops from the instructions. The first set of loops have a different order of parallel processing from the second set of loops. A processor unit processes the first group. The processor unit monitors terminations in the first set of loops during processing of the first group. The processor unit determines whether a number of terminations being monitored in the first set of loops is greater than a selectable number of terminations. In response to a determination that the number of terminations is greater than the selectable number of terminations, the processor unit ceases processing the first group and processes the second group.

12 Claims, 7 Drawing Sheets

(56) References Cited

U.S. PATENT DOCUMENTS

| | | |
|---|---|---|
| 2004/0194074 A1 | 9/2004 | Shibayama et al. |
| 2006/0004996 A1 | 1/2006 | Gonion |
| 2007/0233766 A1 | 10/2007 | Gschwind |
| 2007/0294681 A1 | 12/2007 | Tuck et al. |
| 2008/0005498 A1 | 1/2008 | Moreno et al. |
| 2008/0034357 A1 | 2/2008 | Gschwind |
| 2008/0120299 A1 | 5/2008 | Duffy et al. |
| 2008/0195847 A1 | 8/2008 | Wu et al. |
| 2008/0271005 A1* | 10/2008 | Stoodley .................. 717/160 |
| 2009/0288075 A1 | 11/2009 | Song et al. |
| 2009/0307656 A1 | 12/2009 | Eichenberger et al. |
| 2010/0042789 A1 | 2/2010 | Gonion et al. |
| 2011/0161623 A1 | 6/2011 | Eichenberger et al. |
| 2011/0161642 A1 | 6/2011 | Eichenberger et al. |
| 2011/0161643 A1 | 6/2011 | Eichenberger et al. |
| 2012/0180031 A1 | 7/2012 | Eichenberger et al. |
| 2012/0191953 A1 | 7/2012 | Eichenberger et al. |
| 2012/0192167 A1 | 7/2012 | Eichenberger et al. |

FOREIGN PATENT DOCUMENTS

| | | |
|---|---|---|
| GB | 2409064 A | 6/2005 |
| WO | WO200029941 A1 | 5/2000 |
| WO | WO2006044978 A2 | 4/2006 |

OTHER PUBLICATIONS

Final office action dated Feb. 15, 2013 regarding U.S. Appl. No. 13/430,168, 15 pages.
Non-final office action dated Oct. 15, 2012 regarding U.S. Appl. No. 13/430,168, 17 pages.
Final office action dated Apr. 5, 2013 regarding U.S. Appl. No. 13/435,411, 7 pages.
Non-final office action dated Aug. 21, 2012 regarding U.S. Appl. No. 13/435,411, 11 pages.
Notice of allowance dated Jun. 21, 2013 regarding U.S. Appl. No. 13/435,411, 6 pages.
Notice of allowance dated Aug. 29, 2013 regarding U.S. Appl. No. 12/649,751, 10 pages.
Final office action dated Feb. 22, 2013 regarding U.S. Appl. No. 12/649,751, 20 Pages.
Non-final office action dated Oct. 11, 2012 regarding U.S. Appl. No. 12/649,751, 18 pages.
Final office action dated Jul. 25, 2013 regarding U.S. Appl. No. 12/649,805, 25 pages.
Non-final office action dated Apr. 2, 2013 regarding U.S. Appl. No. 12/649,805, 30 Pages.
Non-final office action dated Oct. 19, 2012 regarding U.S. Appl. No. 12/649,805, 21 pages.
Final office action dated Apr. 8, 2013 regarding U.S. Appl. No. 12/649,860, 6 page.
Non-final office action dated Aug. 22, 2012 regarding U.S. Appl. No. 12/649,860, 15 pages.
Notice of allowance dated Jun. 20, 2013 regarding U.S. Appl. No. 12/649,860, 7 pages.
Non-final office action dated Oct. 26, 2012 regarding U.S. Appl. No. 13/434,903, 18 pages.
Non-final office action dated Apr. 3, 2013 regarding U.S. Appl. No. 13/434,903, 33 pages.
Final office action dated Jul. 26, 2013 regarding U.S. Appl. No. 13/434,903, 26 pages.
Andre, Francoise et al., "The Pandore Data-Parallel Compiler and its Portable Runtime," International Conference on High Performance Computing and Networking (HPCN '95) Milan:Italy (1995), 8 pages.
Gibbs, et al., "IBM eServer BladeCenter JS20 Power Pc 970 Programming Environments", Jan. 2005, www.redbooks.ibm.com/redpapers/pdfs/redp3890.pdf, 140 Pages.
Lam, "Complier Optimizations for Superscaler Computers," Computing Methods in Applied Sciences and Engineering, London, GB, Jan. 29, 1990, pp. 360-377.
McCool, Michael D., "Data-Parallel Programming on the Cell BE and the GPU using the RapidMind Development Platform", Presented at the GSPx Multicore Applications Conference, Santa Clara, Oct. 31 to Nov. 2, 2006, pp. 1-9.
Schlansker et al., Parallelization of Control Recurrences for ILP Processors, International Journal of Parallel Programming, Plenum Press, New York, US, vol. 24, No. 1, Feb. 1, 1996, pp. 65-102.
Zhang, Ye et al., "Hardware for speculative parallelization of partially-parallel loops in DSM multiprocessors," 2 pages, Jan. 1999.
Zhang, Ye et al., Hardware for Speculative Run-Time Parallelization in Distributed Shared-Memory Multiprocessors, IEEE, 1998, 12 pages.
International search report and written opinion dated Apr. 26, 2011 for International application PCT/EP2010/069506, 10 pages.
International Search Report and Written Opinion dated May 30, 2011 for International Applicaton PCT/EP2010/069502, 11 pages.

\* cited by examiner

CEASING PARALLEL PROCESSING OF FIRST SET OF LOOPS UPON SELECTABLE NUMBER OF MONITORED TERMINATIONS AND PROCESSING SECOND SET

BACKGROUND

1. Field

The disclosure relates generally to an improved data processing apparatus and method, and more specifically, to mechanisms for determining the most efficient loops to parallel in a group of instructions.

2. Description of the Related Art

Multimedia extensions (MMEs) have become one of the most popular additions to general-purpose microprocessors. Existing multimedia extensions can be characterized as single instruction multiple datapath (SIMD) units that support packed fixed-length vectors. The traditional programming model for multimedia extensions has been explicit vector programming using either (in-line) assembly or intrinsic functions embedded in a high-level programming language. Explicit vector programming is time-consuming and error-prone. A promising alternative to exploit vectorization technology is to automatically generate SIMD codes from programs written in standard high-level languages.

Although vectorization has been studied extensively for traditional vector processors decades ago, vectorization for SIMD architectures has raised new issues due to several fundamental differences between the two architectures. To distinguish between the two types of vectorization, the latter is referred to as SIMD vectorization, or SIMDization. One such fundamental difference comes from the memory unit. The memory unit of a typical SIMD processor bears more resemblance to that of a wide scalar processor than to that of a traditional vector processor. In the VMX instruction set found on PowerPC® microprocessors produced by International Business Machines Corporation of Armonk, N.Y., for example, a load instruction loads 16-byte contiguous memory from 16-byte aligned memory, ignoring the last 4 bits of the memory address in the instruction. The same applies to store instructions.

There has been a recent spike of interest in compiler techniques to automatically extract SIMD or data parallelism from programs. This upsurge has been driven by the increasing prevalence of SIMD architectures in multimedia processors and high-performance computing. These processors have multiple function units, for example, floating point units, fixed point units, integer units, etc., which can execute more than one instruction in the same machine cycle to enhance the uni-processor performance. The function units in these processors are typically pipelined.

Extracting data parallelism from an application is a difficult task for a compiler. In most cases, except for the most trivial loops in the application code, the extraction of parallelism is a task the application developer must perform. This typically requires a restructuring of the application to allow the compiler to extract the parallelism or explicitly code the parallelism using multiple threads, a SIMD intrinsic, or vector data types available in new programming models, such as OpenCL.

Before a compiler can determine if a portion of code can be parallelized and thereby perform data parallel compilation of the code, the compiler must prove that the portion of code is independent and no data dependencies between the portion of code and other code called by that code exist. Procedure calls are an inhibiting factor to data parallel compilation. That is, data parallel compilation is only possible when the compiler can prove that the code will correctly execute when data parallel optimizations are performed. When the code calls a procedure, subroutine, or the like, from different portions of code, object modules, or the like that are not visible to the compiler at the time of compilation, such data parallel compilation is not possible since the compiler cannot verify that the code will correctly execute when the data parallel optimizations are performed.

SUMMARY

In one illustrative embodiment, a method is present to process instructions with loops. A processor unit creates a first group of instructions having a first set of loops and a second group of instructions having a second set of loops from the instructions. The first set of loops have a different order of parallel processing from the second set of loops. A processor unit processes the first group. The processor unit monitors terminations in the first set of loops during processing of the first group. The processor unit determines whether a number of terminations being monitored in the first set of loops is greater than a selectable number of terminations. In response to a determination that the number of terminations is greater than the selectable number of terminations, the processor unit ceases processing the first group and processes the second group.

In yet another illustrative embodiment, an apparatus comprises a processor, and a memory coupled to the processor. A processor unit creates a first group of instructions having a first set of loops and second group of instructions having a second set of loops from the instructions. The first set of loops have a different order of parallel processing from the second set of loops. A processor unit processes the first group. The processor unit monitors terminations in the first set of loops during processing of the first group. The processor unit determines whether a number of terminations being monitored in the first set of loops is greater than a selectable number of terminations. In response to a determination that the number of terminations is greater than the selectable number of terminations, the processor unit ceases processing the first group and processes the second group.

In yet another illustrative embodiment, a computer program product comprises a computer usable storage medium including computer usable program code for processing instructions with loops. The computer-implemented method comprises computer usable program code for creating a first group of instructions having a first set of loops and second group of instructions having a second set of loops from the instructions. The first set of loops have a different order of parallel processing from the second set of loops. The computer-implemented method comprises computer usable program code for processing the first group. The computer-implemented method comprises computer usable program code for monitoring terminations in the first set of loops during processing of the first group. The computer-implemented method comprises computer usable program code for determining whether a number of terminations being monitored in the first set of loops is greater than a selectable number of terminations. In response to a determination that the number of terminations is greater than the selectable number of terminations the computer-implemented method comprises computer usable program code for ceasing processing of the first group and computer usable program code for processing the second group.

BRIEF DESCRIPTION OF THE SEVERAL VIEWS OF THE DRAWINGS

FIG. 6, separated into

DETAILED DESCRIPTION

As will be appreciated by one skilled in the art, the present invention may be embodied as a system, method or computer program product. Accordingly, the present invention may take the form of an entirely hardware embodiment, an entirely software embodiment including firmware, resident software, micro-code, etc. or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction instructions system, apparatus, or device. The computer-usable medium may include a propagated data signal with the computer-usable program code embodied therewith, either in baseband or as part of a carrier wave. The computer usable program code may be transmitted using any appropriate medium, including but not limited to, wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example, through the internet using an internet service provider.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
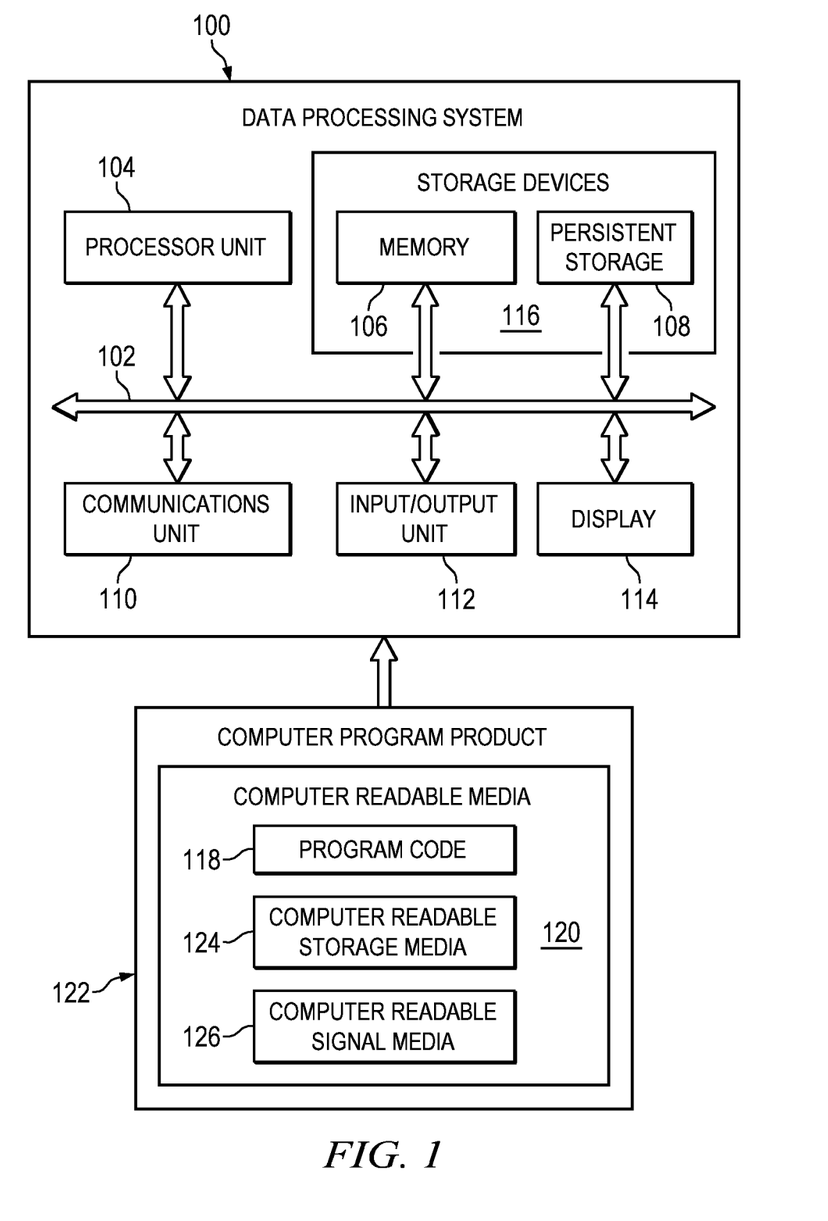
FIG. 1 is an illustration of a data processing system in accordance with an illustrative embodiment.

Turning now to FIG. 1, an illustration of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of processors, a multi-processor core, or some other type of processor, depending on the particular implementation. A set, as used herein with reference to an item, means one or more items. Further, processor unit 104 may be implemented using a set of heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms, depending on the particular implementation.

For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications, and/or programs may be located in storage devices 116, which are in communication with processor unit 104 through communications fabric 102. In these illustrative examples, the instructions are in a functional form on persistent storage 108. These instructions may be loaded into memory 106 for processing by processor unit 104. The processes of the different embodiments may be performed by processor unit 104 using computer implemented instructions, which may be located in a memory, such as memory 106.

These instructions are referred to as program code, computer usable program code, or computer readable program code that may be read and processed by a processor in processor unit 104. The program code in the different embodiments may be embodied on different physical or computer readable storage media, such as memory 106 or persistent storage 108.

Program code 118 is located in a functional form on computer readable media 120 that is selectively removable and may be loaded onto or transferred to data processing system 100 for processing by processor unit 104. Program code 118 and computer readable media 120 form computer program product 122 in these examples. In one example, computer readable media 120 may be computer readable storage media 124 or computer readable signal media 126. Computer readable storage media 124 may include, for example, an optical or magnetic disk that is inserted or placed into a drive or other device that is part of persistent storage 108 for transfer onto a storage device, such as a hard drive, that is part of persistent storage 108. Computer readable storage media 124 also may take the form of a persistent storage, such as a hard drive, a thumb drive, or a flash memory, that is connected to data processing system 100. In some instances, computer readable storage media 124 may not be removable from data processing system 100. In these illustrative examples, computer readable storage media 124 is a non-transitory computer readable storage medium.

Alternatively, program code 118 may be transferred to data processing system 100 using computer readable signal media 126. Computer readable signal media 126 may be, for example, a propagated data signal containing program code 118. For example, computer readable signal media 126 may be an electromagnetic signal, an optical signal, and/or any other suitable type of signal. These signals may be transmitted over communications links, such as wireless communication links, optical fiber cable, coaxial cable, a wire, and/or any other suitable type of communications link. In other words, the communications link and/or the connection may be physical or wireless in the illustrative examples.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108, and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106, or a cache, such as found in an interface and memory controller hub that may be present in communications fabric 102.

Figure 2:
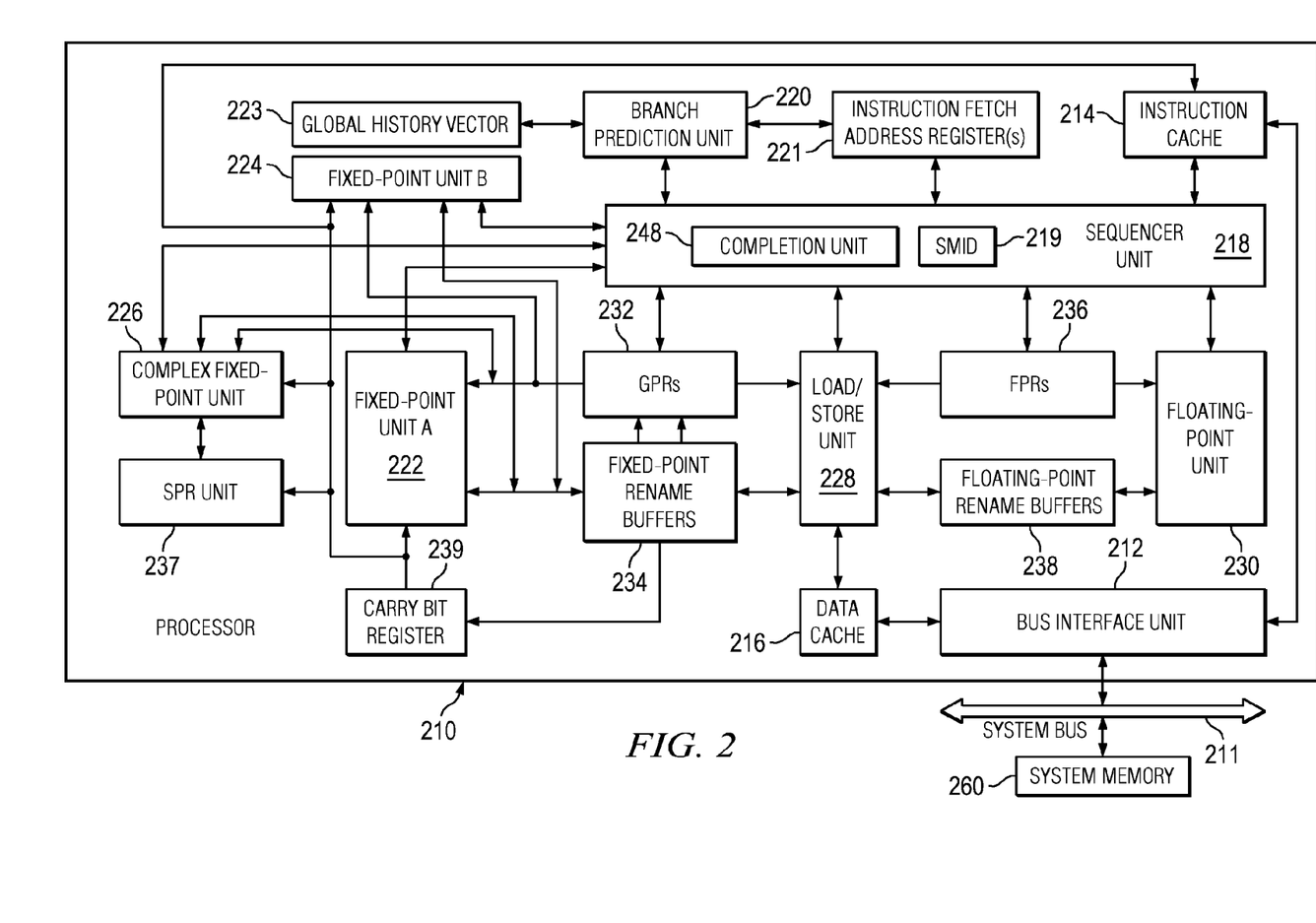
FIG. 2 is an illustration of a processor in accordance with an illustrative embodiment.

With reference now to FIG. 2, an illustration of a processor is depicted in accordance with an illustrative embodiment. Processor 210 is an example of a processor that may be found in processor unit 104 in FIG. 1. One or more of processor 210 may be used in processor unit 104 in FIG. 1.

In an illustrative embodiment, processor 210 is an integrated circuit superscalar microprocessor. Processor 210 includes various units and different types of memory. The different types of memory may include at least one of a register, a buffer, and some other suitable type of memory. These components in processor 210 are implemented as integrated circuits. In addition, in the illustrative embodiment, processor 210 operates using reduced instruction set computer (RISC) techniques.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

System bus 211 connects to bus interface unit (BIU) 212 of processor 210. Bus interface unit 212 controls the transfer of information between processor 210 and system bus 211. Bus interface unit 212 connects to instruction cache 214 and to data cache 216 of processor 210. Instruction cache 214 outputs instructions to sequencer unit 218. In response to such instructions from instruction cache 214, sequencer unit 218 selectively outputs instructions to other circuitry in processor 210. Sequencer unit 218 may also include SIMD 219.

Processor 210 supports the processing of different types of instructions. Some instructions have a set of source operands that describe data used by the instructions. Source operands can be data or an indication of where the data is located. The data may be located in memory in processor 210. Additionally, some instructions have destination operands that describe where results of the instructions should be placed. Destination operands cause elements of processor 210 to place the result of the instruction in memory in processor 210.

The following example instruction has two source operands and a destination operand "fadd source operand a, source operand b, destination operand c." In this example, fadd stands for floating-point addition operator. During processing of the example fadd instruction, elements of processor 210 will process the fadd instruction by adding the value from source operand a to the value from source operand b and placing the result value into destination operand c.

In addition to sequencer unit 218, processor 210 includes multiple units. These units include, for example, branch prediction unit 220, fixed-point unit A (FXUA) 222, fixed-point unit B (FXUB) 224, complex fixed-point unit (CFXU) 226, load/store unit (LSU) 228, and floating-point unit (FPU) 230. Fixed-point unit A 222, fixed-point unit B 224, complex fixed-point unit 226, and load/store unit 228 input their source operand information from general-purpose architectural registers (GPRs) 232 and fixed-point rename buffers (PFRs) 234.

Moreover, fixed-point unit A 222 and fixed-point unit B 224 input a "carry bit" from carry bit (CA) register 239. Fixed-point unit A 222, fixed-point unit B 224, complex fixed-point unit 226, and load/store unit 228 output results of their operations for storage at selected entries in fixed-point rename buffers 234. These results are destination operand information. In addition, complex fixed-point unit 226 inputs and outputs source operand information and destination operand information to and from special-purpose register processing (SPR) unit 237.

Floating-point unit 230 inputs its source operand information from floating-point architectural registers (FPRs) 236 and floating-point rename buffers 238. Floating-point unit 230 outputs results of its operation for storage at selected entries in floating-point rename buffers 238. In these examples, the results are destination operand information.

In response to a load instruction, load/store unit 228 inputs information from data cache 216 and copies such information to selected ones of fixed-point rename buffers 234 and floating-point rename buffer 238. If such information is not stored in data cache 216, then data cache 216 inputs through bus interface unit 212 and system bus 211 the information from system memory 260 connected to system bus 211. Moreover, data cache 216 is able to output through bus interface unit 212 and system bus 211 information from data cache 216 to system memory 260 connected to system bus 211. In response to a store instruction, load/store unit 228 inputs information from a selected one of general-purpose architectural registers (GPRs) 232 and fixed-point rename buffers 234 and copies such information to data cache 216.

Sequencer unit 218 inputs and outputs information to and from general-purpose architectural registers (GPRs) 232 and fixed-point rename buffers 234. From sequencer unit 218, branch prediction unit 220 inputs instructions and signals indicating a present state of processor 210. In response to such instructions and signals, branch prediction unit 220 outputs to sequencer unit 218 and instruction fetch address register(s) (IFAR) 221 signals indicating suitable memory addresses storing a sequence of instructions for processing by processor 210.

In response to such signals from branch prediction unit 220, sequencer unit 218 fetches the indicated sequence of instructions from instruction cache 214. If one or more of the sequence of instructions is not stored in instruction cache 214, then instruction cache 214 inputs through bus interface unit 212 and system bus 211 such instructions from system memory 260 connected to system bus 211.

In response to the instructions input from instruction cache 214, sequencer unit 218 selectively dispatches the instructions to selected ones of branch prediction unit 220, fixed-point unit A 222, fixed-point unit B 224, complex fixed-point unit 226, load/store unit 228, and floating-point unit 230. Each unit processes one or more instructions of a particular class of instructions. For example, fixed-point unit A 222 and fixed-point unit B 224 perform a first class of fixed-point mathematical operations on source operands, such as addition, subtraction, ANDing, ORing and XORing. Complex fixed-point unit 226 performs a second class of fixed-point operations on source operands, such as fixed-point multiplication and division. Floating-point unit 230 performs floating-point operations on source operands, such as floating-point multiplication and division.

Information stored at a selected one of fixed-point rename buffers 234 is associated with a storage location. An example of a storage location may be, for example, one of general-purpose architectural registers (GPRs) 232 or carry bit (CA) register 239. The instruction specifies the storage location for which the selected rename buffer is allocated. Information stored at a selected one of fixed-point rename buffers 234 is copied to its associated one of general-purpose architectural registers (GPRs) 232 or carry bit register 239 in response to signals from sequencer unit 218. Sequencer unit 218 directs such copying of information stored at a selected one of fixed-point rename buffers 234 in response to "completing" the instruction that generated the information. Such copying is referred to as a "writeback."

As information is stored at a selected one of floating-point rename buffers 238, such information is associated with one of fixed-point rename buffers 234. Information stored at a selected one of floating-point rename buffers 238 is copied to its associated one of fixed-point rename buffers 234 in response to signals from sequencer unit 218. Sequencer unit 218 directs such copying of information stored at a selected one of floating-point rename buffers 238 in response to "completing" the instruction that generated the information.

Completion unit 248 in sequencer unit 218 tracks the completion of the multiple instructions. These instructions are instructions being processed within the units. When an instruction or a group of instructions have been completed successfully, in an sequential order specified by an application, completion unit 248 may be utilized by sequencer unit 218 to cause the transfer of the results of those completed instructions to the associated general-purpose registers. Completion unit 248 is located in memory in processor 210 in this illustrative example. In other illustrative examples, processor 210 may include hardware components that form completion unit 248.

A number of the different illustrative embodiments may be implemented within completion unit 248 in these examples. Completion unit 248 may include logic or other functions to track the completion of instructions in accordance with an illustrative embodiment.

Global history vector (GHV) 223 is connected to branch prediction unit 220. Global history vector 223 stores recent paths of instruction processing by processor 210. Global history vector 223 is stored in memory in processor 210.

Branch prediction unit 220 predicts whether a branch based on the path of processing. This path may be identified by the history of the last few branches to have been processes.

Branch prediction unit 220 stores a bit-vector, referred to as a "global history vector," that represents the recent path of processing. Global history vector 223 stores bits of data. Each bit of data is associated with the instructions. The position of a bit in global history vector 223 indicates how recently the associated instructions were fetched. For example, bit-0 in global history vector 223 may represent the most recent fetch and bit-n may represent n fetches ago. If the instructions fetched contained a branch instruction whose branch was taken, then a "1" may be indicated in global history vector 223 corresponding to that instruction. Otherwise, a "0" may be indicated in global history vector 223.

Upon each successive fetch of instructions, global history vector 223 is updated by shifting in appropriate "1"s and "0"s and discarding the oldest bits. The different components illustrated for processor 210 are not meant to provide architectural limitations to the manner in which different embodiments may be implemented. The different illustrative embodiments may be implemented in a processor unit including components in addition to or in place of those illustrated for processor 210. Other components shown in FIG. 2 can be varied from the illustrative examples shown.

The different illustrative embodiments recognize and take into account that it is difficult for compilers to parallel loops in program code with the best optimization. Program code may have certain loops in parallel which have a high number of terminations and consume many clock cycles. Programs with wasted clock cycles and high number of loop terminations are not desirable. Termination of a loop may be the act of or request to finalize a parallel block normally wherein the partial results of the block will not be used. Termination of a loop may also be the act of or request to finalize a parallel block before normal processing of the block has completed or aborted because another block has produced the desired result. Termination of a loop may also be the act of or request to finalize a parallel block normally wherein some portion of the results of the block will be used determined by a rule. A block of code may be a loop or a set of nested loops.

The illustrative embodiments comprise a method, data processing system, and computer program product, in a data processing system having a processor unit for processing instructions with loops. A processor unit creates a first group of instructions having a first set of loops and second group of instructions having a second set of loops from the instructions. The first set of loops have a different order of parallel processing from the second set of loops. A processor unit processes the first group. The processor unit monitors terminations in the first set of loops during processing of the first group. The processor unit determines whether a number of terminations being monitored in the first set of loops is greater than a selectable number of terminations. In response to a determination that the number of terminations is greater than the selectable number of terminations, the processor unit ceases processing the first group and processes the second group.

Figure 3:
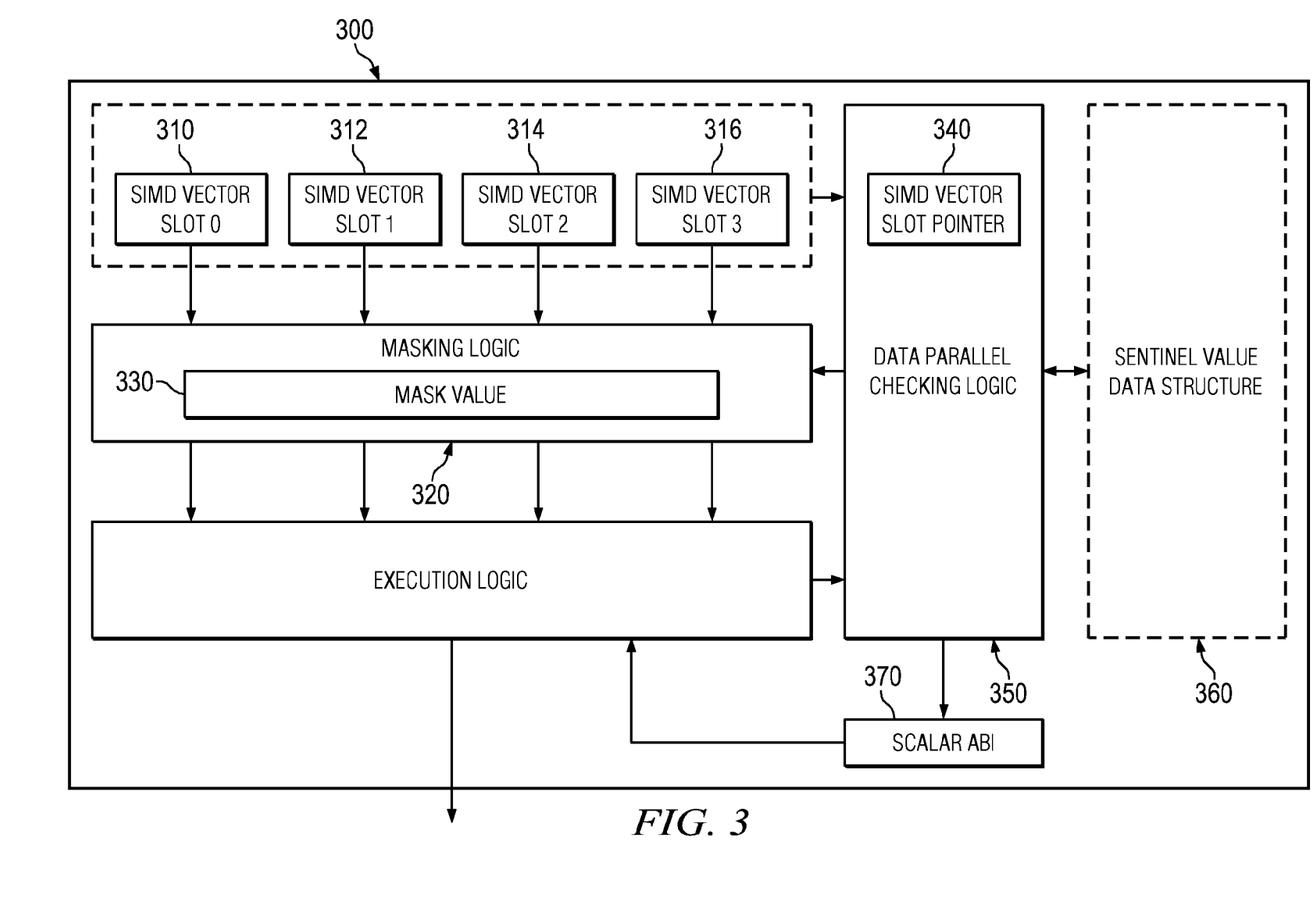
FIG. 3 is an example diagram of a SIMD unit in which hardware logic may be provided for performing, or at least assisting with the performance, of a data parallel call in accordance with an illustrative embodiment.

FIG. 3 is an example diagram of a SIMD unit in which hardware logic may be provided for performing, or at least assisting with the performance, of a data parallel call in accordance with one illustrative embodiment. The SIMD unit shown is a 4-wide SIMD unit in which there are 4 SIMD vector slots per vector. It should be appreciated that the illustrative embodiments are not limited to use with a SIMD unit or with a 4-wide SIMD unit. To the contrary, the mechanisms of the illustrative embodiments may be implemented in other architectures, such as multithreaded architectures, or the like, that may or may not use SIMD units. Furthermore, other widths of SIMD units may be utilized without departing from the spirit and scope of the illustrative embodiments. For example, a 2-wide, 8-wide, 16-wide, or the like, SIMD unit may be utilized.

Furthermore, as mentioned above, the mechanisms of the illustrative embodiments may be implemented entirely in software or in a combination of hardware and software without departing from the spirit and scope of the illustrative embodiments. For example, software may implement the data parallel checking logic 350 of FIG. 3 while the other mechanisms in FIG. 3 may be implemented in hardware which supports the operation of the data parallel checking logic 350. For purposes of the following description, however, it will be assumed that the elements shown in FIG. 3 are implemented as hardware logic within a processor of a data processing system.

As shown in FIG. 3, the SIMD unit 300 includes SIMD vector slot registers 310-316. SIMD unit 300 may be on example of one implementation of SIMD unit 219 as shown in FIG. 2. The data in each SIMD vector slot register 310-316 may correspond to a separate iteration of a loop within a given parallel execution group/section. This data may comprise an address of an instruction/data that is the target of the operation being performed by the parallel execution associated with that SIMD vector slot register 310-316. Thus, for example, SIMD slot 0 310 may store address information for a first instruction that is to be executed in parallel, SIMD slot 1 312 may store address information for a second instruction that is to be executed in parallel, and the like. The address information in each SIMD slot 0-3 310-316 may be the same or different. For example, if multiple executions of a same instruction are being performed in parallel, they may all reference the same address. This may occur, for example, if multiple iterations of a loop are being performed in parallel.

The SIMD vector slot registers 310-316 are coupled to masking logic 320. The masking logic allows software or hardware to prevent a corresponding SIMD vector slot register 310-316 from contributing to the parallel execution. Initially, the masking logic 320 allows all of the SIMD vector slots 310-316 to contribute to the parallel execution results. However, in the event that determination is made that a particular SIMD vector slot 310-316 should not be allowed to complete its execution, for example, a particular SIMD vector slot 310-316 is not part of a parallel execution group or only a preferred SIMD vector slot is to be utilized, the SIMD vector slot 310-316 corresponding to a parallel execution that is not to be completed is blocked by the setting of a mask value 330 in the masking logic 320 that identifies which SIMD vector slots 310-316 may contribute to a result of the parallel execution. For example, initially, the mask value may be set to "1 1 1 1" with bits in the mask value 330 being set to "0" when a determination is made that a corresponding SIMD vector slot 310-316 is not part of the parallel execution group or only a preferred SIMD vector slot, for example, slot 310, for scalar operations is to be used. It should be noted that the values 0 and 1 in the present description are only exemplary of values that can be used to indicate the logical values of, respectively, false and true. In other illustrative embodiments, other representations may be utilized, such as the values 0 and −1, two disjoint set of integer values, two disjoint set of floating point values, or the like.

The data parallel checking logic 350 operates on the address information of the target routines identified by the addresses in the SIMD vector slots 310-316, and determines how to set the bits in the mask value 330 of the masking logic 320 so that appropriate operations associated with select SIMD vector slots 310-316 may be allowed to complete execution while others are blocked. For the calling code, instructions are included in the code, such as by the compiler, to move execution from a scalar mode, in which the execution begins, to a data parallel processing mode and generate an initial mask for the data parallel processing mode. When the data parallel region of code is done executing, instructions are included in the code to move from the data parallel processing mode back into the scalar mode.

In some embodiments, all code may be assumed to be parallelized, whether it is actually or not, in which case each call may be tested in this manner, whether it is part of a data parallel portion/region of code or not. In other illustrative embodiments, the compiler may statically generate up to three versions of each portion of code, for example, functions, one that is only sequential code, one that is data parallel code, and one that is data parallel code with mask values associated with it. The compiler may call directly the sequential version when the compiler knows that it calls a function in a static context. The compiler may directly call the data parallel version when the compiler knows that this data parallel function is applicable in a given context. The compiler may call the data parallel version with masks. The mode is a default if the other two situations are not discernable to the compiler.

The data parallel checking logic 350 operates in response to a data parallel call being performed from one of a scalar region or a data parallel region of calling code. The data parallel call is either an instruction, or includes an instruction, that informs the data processing system that a data parallel call is in progress. A data parallel region is region of code that has been determined by a compiler to be data parallel. There are no data dependencies that prevent parallel execution of more than one iteration or thread at substantially a same time, under the assumptions of the illustrative embodiments that code is data parallel unless proven to be not data parallel. The data parallel call is a call of a portion of code, for example, a routine, procedure, object, or the like, whose implementation is unknown and not clear whether the target called routine is data parallel or not.

In response to a data parallel call, the data parallel checking logic 350 compares the target address of target portion of code being called by the data parallel call, to the target addresses stored in the other SIMD vector slots 310-316. The addresses stored in the SIMD vector slot 312-316, for example, are compared to the first SIMD vector slot 310 in sequence and a determination is made as to whether they have a matching address. Each SIMD vector slot 312-316 having a matching address is added to a same parallel execution group until a first non-matching address in a SIMD vector slot 312-316 is encountered. Only those having matching target addresses stored in the SIMD vector slots 310-316 are included in the same parallel execution group while other SIMD vector slots 310-316 not having a matching address are excluded from the parallel execution group.

A pointer 340 is set based on the identification of matching addresses in SIMD vector slots 310-316. The pointer 340 points to the first SIMD vector slot 312-316 that does not have a matching target address as the first SIMD vector slot 310. This pointer 340 thus, points to the first SIMD vector slot 312-316 for a next parallel execution group for a subsequent pass, as discussed hereafter.

Once a parallel execution group is generated in this manner, in accordance with one illustrative embodiment, a determination is made by the logic data parallel checking logic 350 as to whether the target code corresponding to the target address of the parallel execution group is data parallel code or scalar code. This determination involves looking at a sentinel value associated with the portion of code which identifies whether the code was optimized using data parallel optimizations by the compiler. The sentinel value is stored at a known location, such as at the address-1 location for the address of the calling code, or target portion of code as discussed hereafter, in a sentinel value data structure 360, for example.

The calling code is either data parallel or scalar code as may be determined by the compiler at compilation time. The compiler may insert instructions into the code defining sections or regions of the code as data parallel code or scalar code. Unless data parallel code instructions are inserted into the code, either by the compiler or by the code writer, the code is considered to be scalar. Based on the setting of the sentinel value for the target code and the nature of the calling code, the data parallel checking logic 350 determines how to perform the data parallel call. For example, if the sentinel value corresponding to the target address indicates that the target portion of code is data parallel code, and the calling code is determined to be data parallel code, the data parallel call for the corresponding SIMD vector slot 310-316 is executed in parallel for each of the SIMD vector slots 310-316 that are part of the parallel execution group while other SIMD vector slots 310-316 are blocked from contributing to the execution results during this pass. This blocking may be performed by the data parallel checking logic 350 setting a mask bit in the mask value 330 of the masking logic 320 to block certain SIMD vector slots 310-316 that are not part of the current parallel execution group. The calls/instructions associated with the remaining SIMD vector slots 310-316 are then executed in a subsequent iteration.

If the sentinel value indicates that the target routine is not data parallel, for example, the target routine is a scalar routine, then the arguments of the call to the target routine, for a first SIMD vector slot, for example, SIMD vector slot 310, in the parallel execution group, are converted to scalar arguments using a scalar application binary interface (ABI) 370, which is a low level scalar interface between the application code and the operating system. The logic data parallel checking logic 350 then causes the target portion of code to be called in a scalar manner and result values are returned. The results that are returned are then converted back into data parallel return values by the data parallel checking logic 350. For example, the scalar ABI 370 may provide a vector to a handler, such as the calling instruction, that converts the vector arguments to scalar arguments, such as by using a preferred vector slot for scalar arguments.

As an example, assume that there is a vector of 4 addresses, vector slots 0, 1, and 3 have been determined to have the same address to a scalar routine or function, and there is a loop iterating over all of the vector slots. For each slot S, in turn, a determination is made as to whether the corresponding mask is on/off. When the mask is on, each of the parameters required by the function are moved to where they are expected by the scalar function, in other words, in the scalar register or preferred scalar vector slot. The function can then be called and the return value is placed in the slot S of the SIMD vector register holding the return value.

The above process is then repeated for each SIMD vector slot that was not executed in the previous execution. Thus, if the sentinel value indicates a data parallel target routine, then the next SIMD vector slot that was not in the parallel execution group, as pointed to by the pointer 340, is the first SMID vector slot for the next pass or iteration. The above process may be repeated such that this next SIMD vector slot's address may be compared with any remaining SIMD vector slots whose instructions have not completed, to determine if an additional parallel execution group can be generated. If the sentinel value indicates that the target routine is scalar, then the next SIMD vector slot may be a SIMD vector slot that was in the parallel execution group but whose instruction was not actually completed due to the scalar execution, or may be a SIMD vector slot that was not in the original parallel execution group, depending upon the situation. The process is repeated until all of the instructions in the SIMD vector slots 310-316 are completed, at which time the operation repeats for a next set of values in the SIMD vector register.

If the calling code that is calling the target routine is scalar code, not data parallel code, the data parallel call may again be used. However, because the calling code is scalar, the target portion of code is called in a scalar manner. In such a case, the data parallel call again causes the data parallel checking logic 350 to investigate the sentinel value for the target portion of code and determine if the sentinel value indicates that the target routine is data parallel or not. If the target routine is scalar, then the target routine is called in a normal scalar manner by the scalar calling code. However, if the target routine is data parallel, then the arguments of the call are converted to a scalar form by using the mask value 330 to mask all but a preferred SIMD vector slot, for example, SIMD vector slot 310 using mask value (1 0 0 0). The target routine is then called with the specified mask value 330 such that the data parallel target routine is executed in a data parallel manner using the preferred SIMD vector slot 310.

Return values are then converted back into a scalar form from the vector form, such as providing a vector for the return processing. Return values are typically found in one register, dictated by the convention that holds for the machine/operating system/compiler, or any combination thereof. For example, a scalar function may be expected to return its return value in register 3; and a SIMD parallel function may be expected to return its value in SIMD vector register 3. Then, when returning from scalar code, the value in scalar register r3 is moved to the Sth slot of the SIMD vector register, where S corresponds to the slot being processed at this time by the scalar function. Technically, values can be moved from one register file to another register file using special move instructions or via memory by first storing the value from one register file into memory, and then reading the value from memory into the second register file.

Figure 4:
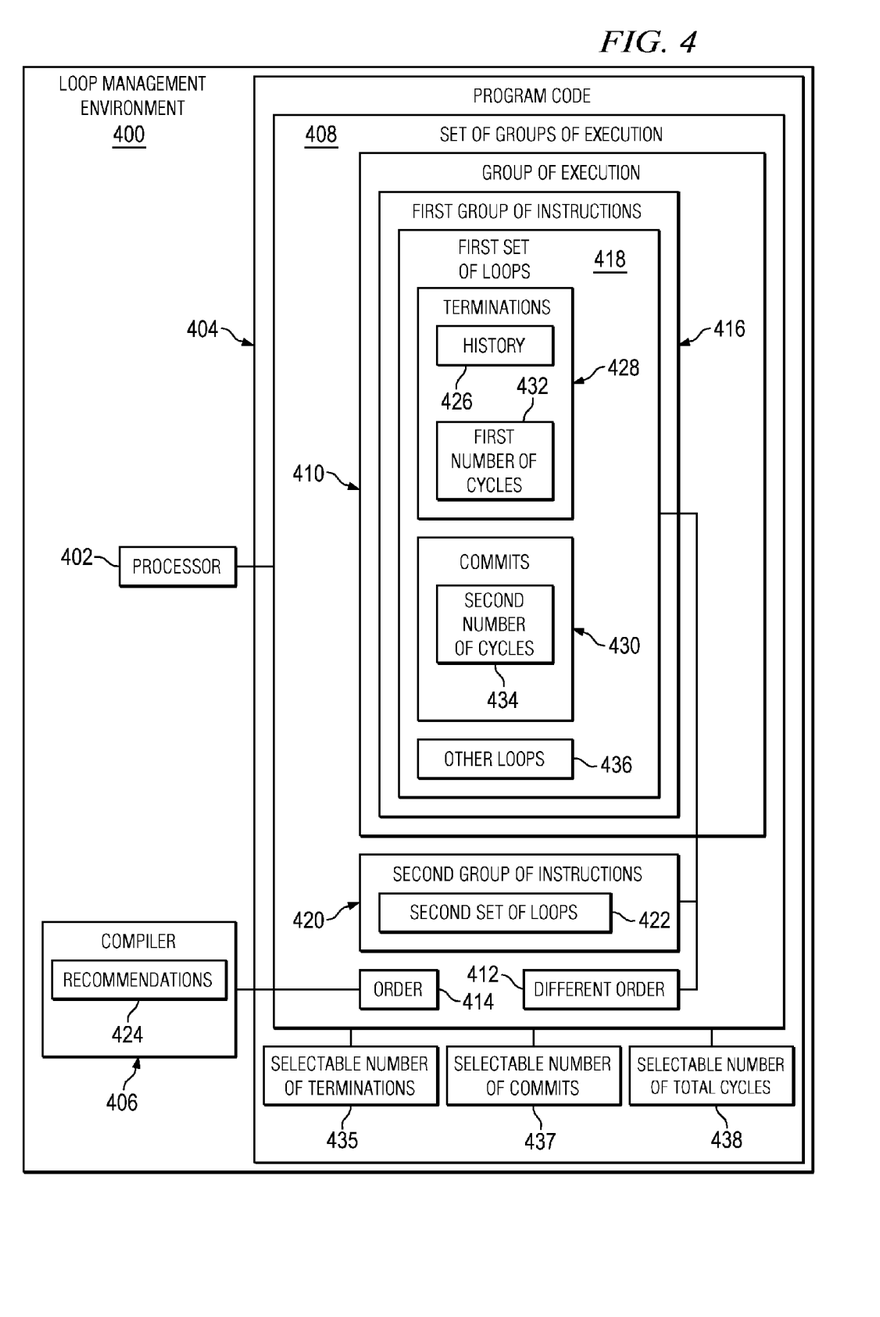
FIG. 4 is an illustration of a loop management environment in accordance with an advantageous embodiment.

Turning to FIG. 4, an illustration of a loop management environment is depicted in accordance with an advantageous embodiment. Loop management environment 400 is an environment where processor 402 manages loops in program code 404. Loop management environment 400 may be implemented in SIMD unit 300 as shown in FIG. 3. Loop management environment 400 may comprise processor 402, program code 404, and compiler 406.

Processor 402 may be one example of one implementation of processor 310 as show in FIG. 3. Processor 402 may be one example of one implementation of processor unit 104 as show in FIG. 1. Processor 402 runs program code 404 and compiler 406.

Compiler 406 is a computer program that transforms source code, such as program code 404, written in a programming language into another computer language to create an executable program. With the mechanisms of the illustrative embodiments, when compiler 406 compiles a portion of program code 404, compiler 406 assumes that any calls made by compiler 406 to other portions of code, such as in another object model, which are not visible to compiler 406, are in fact able to be executed in a data parallel manner. By "data parallel" what is meant is that there are no dependencies between iterations of execution of the portion of code, for example, the object model, routine, and procedure. "Data parallel" also means there are no dependencies within the portion of code, such as loops, that would prevent multiple iterations of the portion of code to be executed in parallel at substantially the same time. Similarly, such assumptions of data parallelism may be made in situations where program code 404 may call a set of known functions, but it is not known to compiler 406 at compile time exactly which functions will be called by the application code at runtime.

The illustrative embodiments assume code is data parallel unless proven during runtime to be scalar, at which point mechanisms are provided for handling the scalar execution of the portion of code. Compiler 406, calls to other portions of code that are not visible to compiler 406, or calls to portions of code that compiler 406 does not know at compile time, will be called by the code at runtime, and replaces the calls with a data parallel call in accordance with the illustrative embodiments. The data parallel call verifies the assumption of data parallelism of the target portion of code, hereafter referred to as the target routine, and converts arguments as necessary, based on whether the target routine is determined at runtime to be actually data parallel or not, and also based on the nature of the portion of code calling the target routine, for example, whether the calling code is data parallel or scalar code.

A linker acts on the optimized and compiled code. In these examples, the linker links the code to other portions of code called by the code. As part of the linking process, the linker looks at the metadata associated with the portions of code called by the compiled code to determine if these other portions of code are data parallel or scalar. For example, compiler 406 may store in the metadata of the code an identifier of whether a data parallel optimization was applied to the compiled code or not and this identifier may be used by the linker to determine whether the code is data parallel or scalar code. Based on this determination, the linker may store a sentinel value at an address of the portion of code minus 1, in a table data structure, or at another known storage location, that may be used to determine if the called portion of code is data parallel or scalar. In general, any type of mapping may be used for storing this sentinel value, such as a hash set or any other data structure that allows two types of information to be linked together.

The resulting compiled and linked code, the executable code, may then be executed on a processor utilizing a vector architecture, such as a single instruction multiple data (SIMD) architecture. In some illustrative embodiments, the single instruction multiple data architecture utilizes a preferred scalar slot for scalar operations. Moreover, the architecture may include a single instruction multiple data unit, which may be a function unit, similar to a floating point unit or a fixed point unit, in the processor architecture, which comprises hardware logic for verifying data parallelism of code. The hardware logic may operate at runtime based on the data parallel function calls in the executable code to verify the data parallel nature of the called target routine and to execute the called target routine accordingly.

Program code 404 may be written in any combination of one or more programming languages, including an object oriented programming language such as Java, Smalltalk, C++ or the like, and conventional procedural programming languages, such as the "C" programming language, or similar programming languages. Program code 404 may be compiled in a set of groups of execution 408. Each group of execution 410 is complied code with different order 412 of loops to be run in parallel. For example, in one iteration, the outer loops may be paralleled first. Processor 402 may put set of groups of execution 408 in order 414. Each group of execution 410 has different order 412 of paralleling of the set of loops in each group of execution 410.

Set of groups of execution 408 may comprise first group of instructions 416. First group of instructions 416 is a portion of program code 404 that has been compiled to have first set of loops 418 paralleled in a certain manner. Second group of instructions 420 is similar to first group of instruction 416. However, second group of instructions 420 has second set of loops 422 which are compiled to run in a different parallel order. Set of groups of execution 408 may have as many groups as there are combinations of ways to parallelize the loops in set of groups of execution 408. Order 414 that set of groups of execution 408 are placed in to test which group of execution 410 is most desirable, may be based on recommendations 424 of compiler 406 and/or history 426 of first set of terminations 428.

First set of loops 418 may be a set of nested loops. A nested loop is a loop within a loop. Second set of loops 422 may be the same nested loops as first set of loops 418. Different order 412 may be the order of parallelization of the nested loops. For example, first group of instructions 416 may be a set of instructions with an out loop of a set of nested loops processed in parallel. In this example, second group of instructions 420 may have an inner loop of the set of nested loops processed in parallel. The different groups of instructions may be different iterations or renditions of which loops are being processed in parallel. In this illustrative example, a third group of instructions may be a set of instructions with the nested loops processed serially. The illustrative embodiments provide a method for identifying which set of instructions is most efficient. The illustrative embodiments provide for identifying terminations, commits, processor cycles used in the terminations, processor cycles used in the commits to identify a most efficient set of instructions, or a combination thereof. A commit may be the act of or request to finalize a first block of code thus indicating a readiness to continue processing to a second block of code configured to follow and/or wait for the first block of code to commit. A commit may also be a parallel commit. A parallel commit may be a set of blocks of code that run in parallel wherein at least one block must commit before processing continues that require at least one commit. The parallel commit may also be a set of blocks of code that run in parallel wherein all blocks must commit before processing continues that require all blocks to commit. The parallel commit may also be a set of blocks of code that run in parallel wherein a rule determines the commit condition before processing continues, and wherein the rule is based on a defined partial set of commits happening before continuing. A block of code may be a loop or a set of nested loops.

When each group of execution 410 is executed, a count is kept of the number of terminations, number of commits, number of cycles of the number of terminations, and the number of cycles for the number of commits. A commit is when there is an act of, or request to finalize, a first block of code, thus indicating a readiness to continue processing to a second block of code configured to follow and/or wait for the first block of code to commit. A termination is when there is an act of, or requests to finalize, a parallel block normally wherein the partial results of the block will not be used. For example, first group of instructions 416 has first set of loops 418. First set of loops 418 has terminations 428 and commits 430. Terminations 428 have first number of cycles 432. Commits 430 has second number of cycles 434. First number of cycles 432 is the number of cycles of processor 402 performed before a termination occurs. Second number of cycles 434 is the number of cycles of processor 402 performed before a commit occurs. A cycle of a processor may be a clock cycle of the processor.

Compiler 406 counts terminations 428, first number of cycles 432 of terminations 428, commits 430, and second number of cycles 434 of commits 430. Compiler 406 compares the counted items against selectable number of terminations 435, selectable number of commits 437, and selectable number of total cycles 438. Depending on which counted items are higher than the selectable numbers, first group of instructions 416 may be considered not desirable and processor 402 will start to execute second group of instructions 420. For example, terminations 428 may be compared against selectable number of terminations 435. Compiler 406 may dynamically adjust first set of loops 418 by replacing a portion of first set of loops 418 with other loops 436. Other loops 436 may be other instances of different parallel arrangement of loops.

The illustration of loop management environment 400 in FIG. 4 is not meant to imply physical or architectural limitations to the manner in which different advantageous embodiments may be implemented. Other components in addition to, and/or in place of, the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, program code 404 may be located in various places. Program code 404 may be located on processor 402. Additionally, for example, compiler 406 may be located in other areas, such as processor 402.

Figure 5:
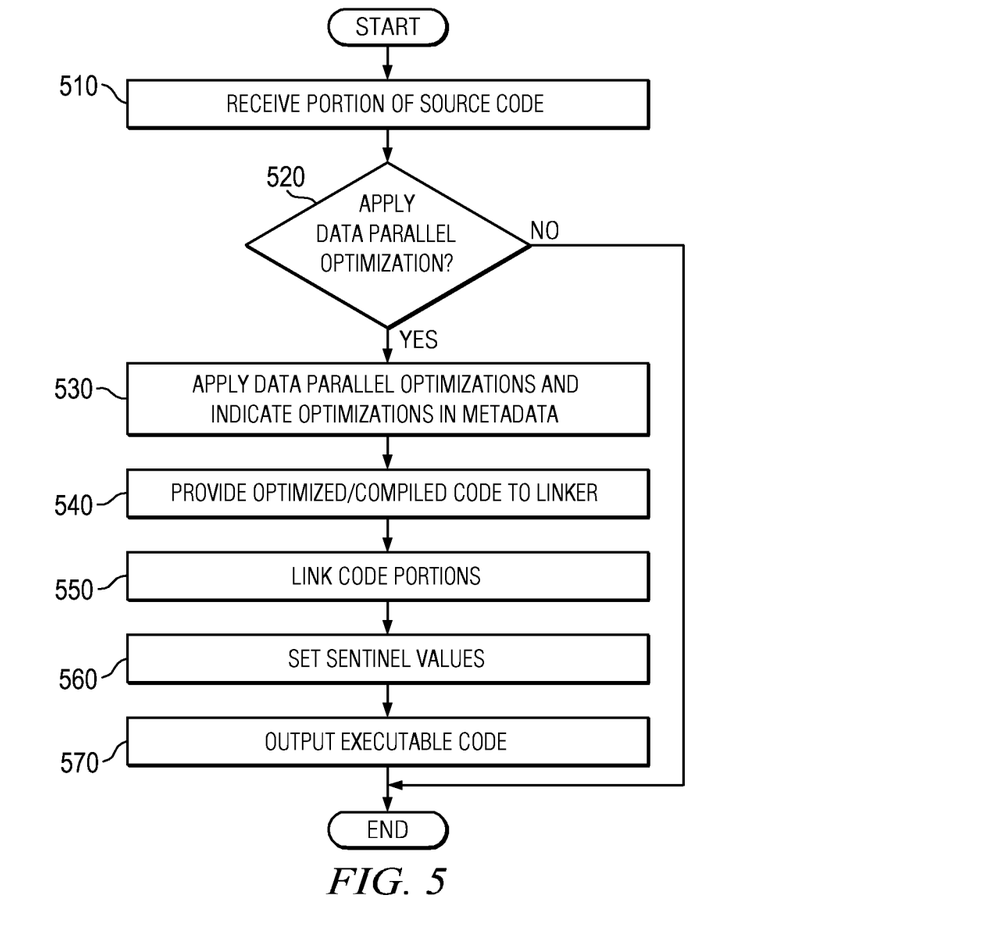
FIG. 5 is a flowchart outlining an example operation for compiling and linking code to generate executable code in accordance with an illustrative embodiment.

Turning to FIG. 5, a flowchart outlining an example operation for compiling and linking code to generate executable code is depicted in accordance with an illustrative embodiment. The process of FIG. 5 may be operated in loop management environment 400 of FIG. 4.

As shown in FIG. 5, the operation starts with receiving a portion of source code (step 510). A determination is made by the compiler as to whether data parallel optimizations may be applied to the portion of source code (step 520). If so, the data parallel optimizations, such as data parallel if conversion or the like, are applied and metadata is created for the portion of code indicating that the data parallel optimization has been applied (step 530). Thereafter, the portion of code is provided to a linker (step 540). The linker links the portion of code with other portions of code, target code, called by the calling code (step 550). The linker sets sentinel values for each portion of code based on the metadata associated with the portions of code to thereby indicate whether the portions of code are data parallel or scalar code (step 560). The resulting executable code is then outputted for execution by a processor (step 570). The operation then terminates.

Figure 6A:
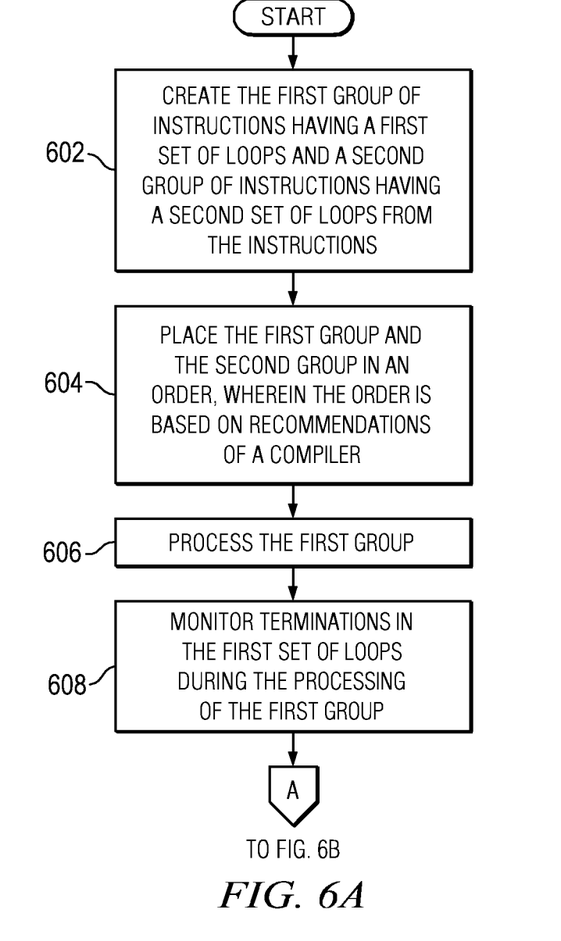
FIG. 6A and FIG. 6B, is a flowchart for processing instructions with loops in accordance with an illustrative embodiment.
Figure 6B:
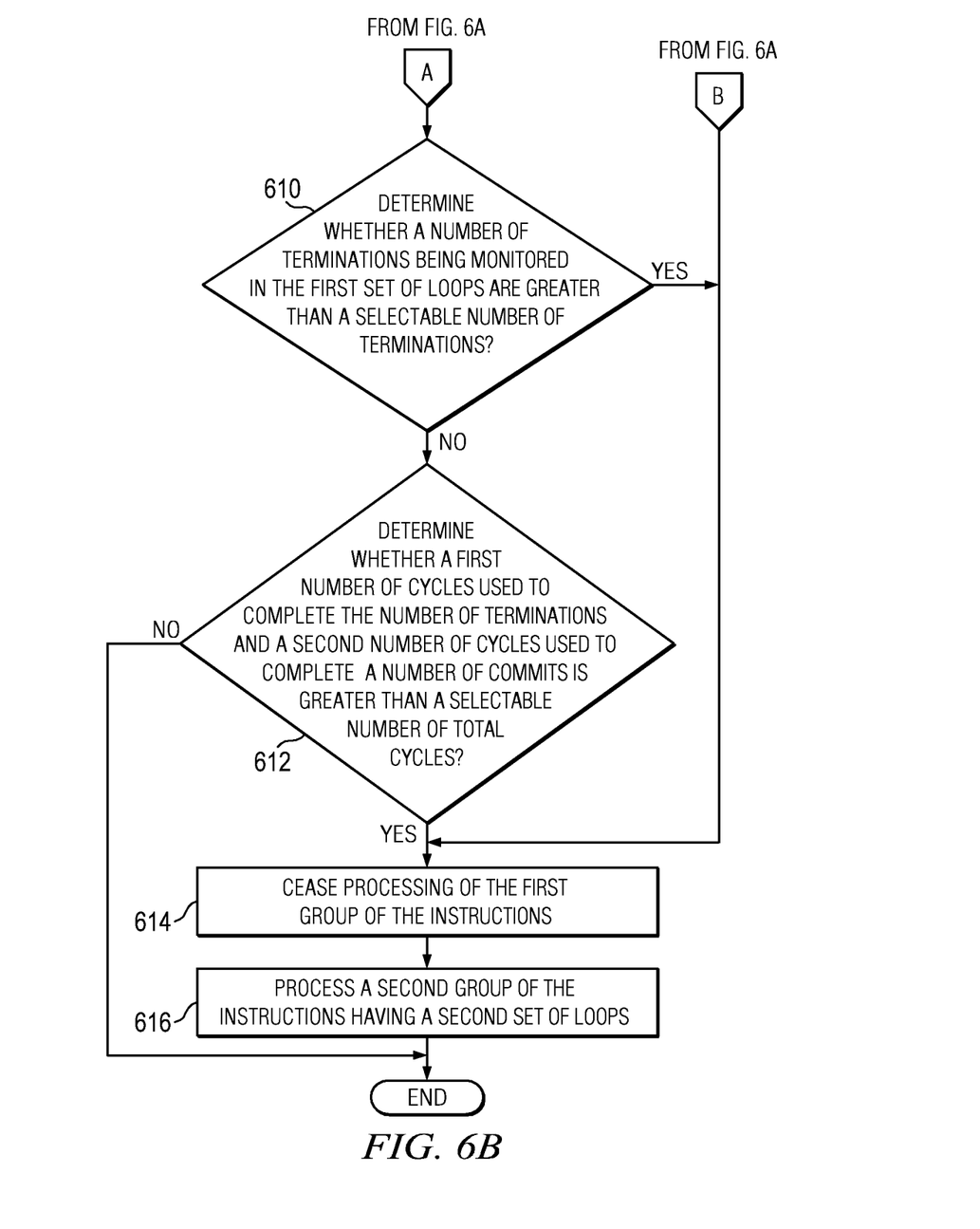

Turning to FIG. 6, which is separated into FIG. 6A and FIG. 6B, a flowchart for processing instructions with loops is depicted in accordance with an illustrative embodiment. The process of FIG. 6 may be implemented in loop management environment 400 of FIG. 4. The steps of FIG. 6 may be performed by a processor unit, and more particularly, by a sequencer unit of the processor unit, such as sequencer unit 218 as shown in FIG. 2.

A processor unit creates a first group of instructions having a first set of loops and a second group of instructions having a second set of loops from the instructions (step 602). The first set of loops in the first group of instructions have a different order of parallel processing from the second set of loops in the second group of the instructions. The processor unit places the first group and the second group in an order, wherein the order is based on recommendations of a compiler (step 604). The order may be based on recommendations of a compiler. In different illustrative embodiments, the order is based on a history of the number of terminations associated with each group of instructions of the instructions.

The processor unit then processes the first group (step 606). The processor unit monitors terminations in the first set of loops during processing of the first group (step 608). The processor unit determines whether a number of terminations being monitored in the first set of loops are greater than a selectable number of terminations (step 610). The processor unit determines whether a first number of cycles used to complete the number of terminations and a second number of cycles used to complete a number of commits is greater than a selectable number of total cycles (step 612). The processor unit ceases processing of the first group of the instructions in response to a determination that the number of terminations is greater than the selectable number of terminations or the first number of cycles used to complete terminations and the second number of commits is greater than a selectable number of total cycles (step 614). The processor unit processes a second group of the instructions having a second set of loops (step 616). Thereafter, the process terminates.

The illustrative embodiments comprise a method, data processing system, and computer program product, in a data processing system having a processor unit for processing instructions with loops is depicted. A processor unit creates a first group of instructions having a first set of loops and second group of instructions having a second set of loops from the instructions. The first set of loops have a different order of parallel processing from the second set of loops. A processor unit processes the first group. The processor unit monitors terminations in the first set of loops during processing of the first group. The processor unit determines whether a number of terminations being monitored in the first set of loops is greater than a selectable number of terminations. In response to a determination that the number of terminations is greater than the selectable number of terminations, the processor unit ceases processing the first group and processes the second group.

The different illustrative embodiments provide a way for the compiler to analyze different iterations of program code. Once analyzed, the best iteration, or a sufficient iteration may be selected. The iteration may be selected based on number of clock cycles the parallel loops use and the number of terminations in those loops.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer usable or computer readable medium providing program code for use by or in connection with a computer or any instruction instructions system. For the purposes of this description, a computer usable or computer readable medium can be any tangible apparatus that can contain, store, communicate, propagate, or transport the program for use by or in connection with the instruction instructions system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual instructions of the program code, bulk storage, and cache memories which provide temporary storage of at least some program code in order to reduce the number of times code must be retrieved from bulk storage during instructions.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for processing instructions with loops during compile, the method comprising:
    creating, by a processor unit, a first group of instructions having a first set of loops and second group of instructions having a second set of loops from the instructions;
    placing, by the processor, the first group and the second group in an order, wherein the order is based on a history of the number of terminations associated with each set of loops, wherein the first set of loops have a different order of parallel processing from the second set of loops;
    processing, by the processor unit, the first group;
    monitoring, by the processor unit, terminations in the first set of loops during processing of the first group;
    determining, by the processor unit, whether a number of terminations being monitored in the first set of loops is greater than a selectable number of terminations; and
    responsive to a determination that the number of terminations is greater than the selectable number of terminations:
        i) ceasing, by the processor unit, processing the first group; and
        ii) processing, by the processor unit, the second group.

2. The computer-implemented method of claim 1 further comprising:
    placing, by the processor, the first group and the second group in an order, wherein the order is based on recommendations of a compiler.

3. The computer-implemented method of claim 1 further comprising:
    responsive to the determination that the number of terminations is greater than the selectable number of terminations, identifying, by the processor, which loops of the first set of loops have the terminations; and
    rearranging, by the processor, the first set of loops based on which loops of the first set of loops have the terminations to form the second set of loops.

4. The computer-implemented method of claim 1 further comprising:
    determining, by the processor, a first number of cycles used to complete the number of terminations;
    determining, by the processor, a second number of cycles used to complete a number of commits;
    responsive to the first number of cycles used to complete the number of terminations and the second number of cycles used to complete the number of commits being greater than a selectable number of total cycles, processing, by the processor unit, the second group.

5. An apparatus comprising:
    a processor, and
    a memory coupled to the processor, wherein the processor is configured to:
        create a first group of instructions having a first set of loops and second group of instructions having a second set of loops from the instructions;
        place the first group and the second group in an order, wherein the order is based on a history of the number of terminations associated with each set of loops, wherein the first set of loops have a different order of parallel processing from the second set of loops;
        process the first group;
        monitor terminations in the first set of loops during processing of the first group;
        determine whether a number of terminations being monitored in the first set of loops is greater than a selectable number of terminations; and
        responsive to a determination that the number of terminations is greater than the selectable number of terminations:
            i) cease processing the first group; and
            ii) process the second group.

6. The apparatus of claim 5, wherein the processor is configured to place the first group and the second group in an order, wherein the order is based on recommendations of a compiler.

7. The apparatus of claim 5, wherein the processor is configured to:
    responsive to the determination that the number of terminations is greater than the selectable number of terminations, identify which loops of the first set of loops have the terminations; and
    rearrange the first set of loops based on which loops of the first set of loops have the terminations to form the second set of loops.

8. The apparatus of claim 5, wherein the processor is configured to:
    determine a first number of cycles used to complete the number of terminations;
    determine a second number of cycles used to complete a number of commits;
    responsive to the first number of cycles used to complete the number of terminations and the second number of cycles used to complete the number of commits being greater than a selectable number of total cycles, process the second group.

9. A computer program product comprising:
    a computer usable storage medium including computer usable program code for managing a set of loops, the computer-implemented method comprising:
    computer usable program code for creating a first group of instructions having a first set of loops and second group of instructions having a second set of loops from the instructions;
    computer usable program code for placing the first group and the second group in an order, wherein the order is based on a history of the number of terminations associated with each set of loops, wherein the first set of loops have a different order of parallel processing from the second set of loops;
    computer usable program code for processing the first group;
    computer usable program code for monitoring terminations in the first set of loops during processing of the first group;
    computer usable program code for determining whether a number of terminations being monitored in the first set of loops is greater than a selectable number of terminations; and responsive to a determination that the number of terminations is greater than the selectable number of terminations:
  i) computer usable program code for ceasing processing of the first group; and
  ii) computer usable program code for processing the second group.

10. The computer program product of claim 9 further comprising:
  computer usable program code for placing the first group and the second group in an order, wherein the order is based on recommendations of a compiler.

11. The computer program product of claim 9, wherein computer usable program code for compiling the instructions during processing of the instructions comprises:
  responsive to the determination that the number of terminations is greater than the selectable number of terminations, computer usable program code for identifying which loops of the first set of loops have the terminations; and
  computer usable program code for rearranging the first set of loops based on which loops of the first set of loops have the terminations to form the second set of loops.

12. The computer program product of claim 9 further comprising:
  computer usable program code for determining a first number of cycles used to complete the number of terminations;
  computer usable program code for determining a second number of cycles used to complete the number of commits;
  responsive to the first number of cycles used to complete the number of terminations and the second number of cycles used to complete the number of commits being greater than a selectable number of total cycles, computer usable program code for processing the second group.

\* \* \* \* \*